T. F. TIMBY.
UNIVERSAL JOINT.
APPLICATION FILED JAN. 17, 1910.
954,228.
Patented Apr. 5, 1910.
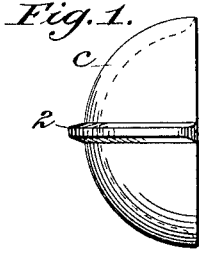
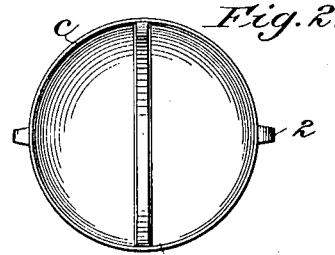
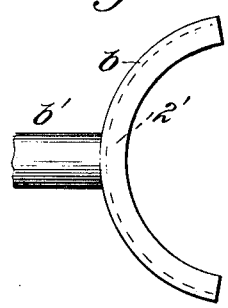
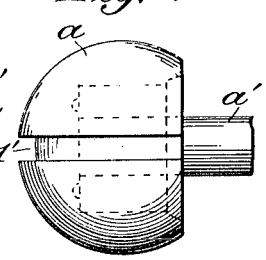
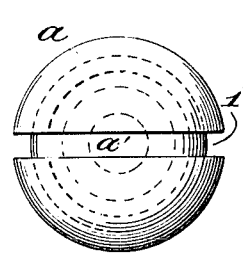
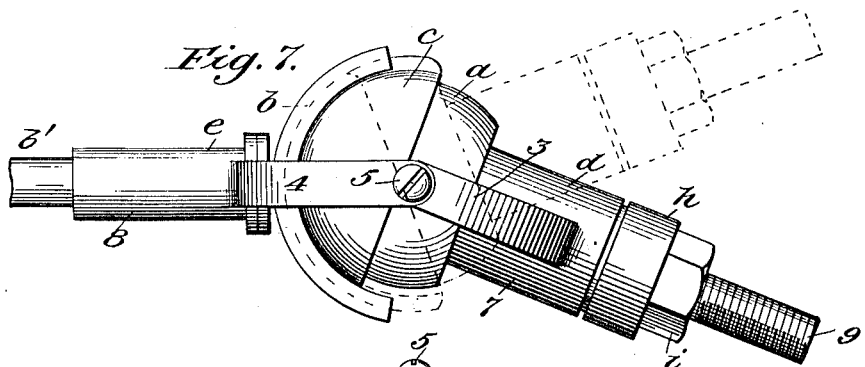
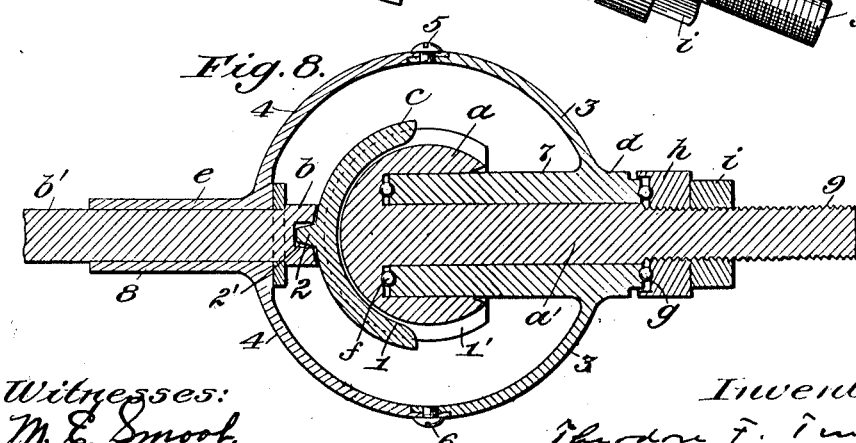

UNITED STATES PATENT OFFICE.

THEODORE F. TIMBY, OF ALMA, MICHIGAN.

UNIVERSAL JOINT.

954,228.  Specification of Letters Patent.  Patented Apr. 5, 1910.

Application filed January 17, 1910. Serial No. 538,397.

*To all whom it may concern:*

Be it known that I, THEODORE F. TIMBY, a citizen of the United States of America, and a resident of Alma, Gratiot county, in the State of Michigan, have invented a new and useful Improvement in Universal Joints, of which the following is a specification.

This invention relates to separable universal joints of the ball and socket type for the transmission of power in motor vehicles and boats, machinery of all kinds, and hand tools.

The present invention consists in certain novel combinations of parts, including a novel concavo-convex ribbed member, and in an improved universal-joint coupling or universal joint embodying such combinations or any of them, as hereinafter particularly described and claimed.

The leading objects of this invention are to obviate providing the ball member with crossed grooves, to locate an anti-friction ball bearing or the like within a recessed ball member, and at the same time to construct a strong and simple universal joint, the members of which can be readily taken apart so as to afford access to every portion thereof with reference to keeping the rubbing surfaces clean and as frictionless as is practicable.

Other objects will be set forth in the general description which follows.

A sheet of drawings accompanies this specification as part thereof.

Figures 1 and 2 are respectively side and face views of the concavo-convex ribbed member of the improved universal joint; Figs. 3 and 4 are respectively side and face views of its fork member; Figs. 5 and 6 are respectively side and face views of the ball member; Fig. 7 is a side view of a universal-joint coupling embodying all said members; and Fig. 8 represents a longitudinal section through all in a plane substantially at right angles to that of Fig. 7.

Like reference characters refer to like parts in all the figures.

The improved universal joint includes a ball member, *a*, in the form of an oblate sphere, constructed with a circumferential groove in one plane coincident with its axis of rotation; a fork member, *b*, having a concave grooved face; and an interposed concavo-convex member, *c*, substantially hemispherical in shape, constructed with internal and external ribs, 1 and 2, fitted respectively to the groove, 1', of said ball member and the groove, 2', of said fork member. Said ball member *a* and fork member *b* are carried respectively by the adjoining or inner ends of a pair of shafts or spindles, *a'* and *b'*, which are mounted respectively in the two parts, *d* and *e*, of an articulated frame. This frame includes interacting arms, 3 and 4, in the form of circular arcs, surrounding the ball and socket and concentric therewith, and a pair of pivots, 5 and 6, radial to the center of said ball and socket. It also includes suitable bearing portions, 7 and 8, for the spindles *a'* and *b'* respectively, and the oblate surface of the ball member *a* is recessed as shown in Fig. 8 so as to admit the inner end of said bearing portion 7 into the ball beyond its center, where the parts are respectively constructed with the opposing seats of a ball bearing, *f*, which is thus protected against obstruction by dust in the most effective manner, and is otherwise effectively arranged. Another ball bearing, *g*, is conveniently formed at the outer end of said bearing portion 7 of the frame *d—e* between the outer end of said bearing portion 7 and a collar, *h*, splined on said spindle *a'* of the ball member. The two ball bearings are tightened to the desired extent by a nut or nuts, *i*, on a threaded portion 9 of said spindle *a'*.

The frame *d—e* may obviously have any desired shape suitable to its functions above stated, and other like modifications will suggest themselves to those skilled in the art.

Having thus described said improvement, I claim as my invention, and desire to patent under this specification:

1. The combination, in a universal joint, of a ball member constructed with a circumferential groove in one plane coincident with its axis of rotation, a fork member having a concave grooved face, and an interposed concavo-convex member constructed with an internal rib fitted to the groove of the ball member and an external rib arranged at right angles to said internal rib and fitted to the groove of said fork member.

2. The combination, in a universal joint, of a ball member in the form of an oblate sphere having its spherical surface provided with a circumferential groove in one plane coincident with its axis of rotation, a fork member having a concave grooved face, and an interposed concavo-convex member, substantially hemispherical in shape, constructed with an internal rib fitted to the groove of the ball member and an external rib arranged at right angles to said internal rib and fitted to the groove of said fork member.

3. The combination, in a universal joint, of a ball member constructed with a circumferential groove in one plane coincident with its axis of rotation, a fork member having a concave grooved face, an interposed concavo-convex member constructed with an internal rib fitted to the groove of the ball member and an external rib arranged at right angles to said internal rib and fitted to the groove of said fork member, and an articulated frame in which said ball member and said fork member are mounted to rotate; said ball member and said fork member being carried at the adjoining ends of a pair of spindles, and said frame being constructed with bearings for said spindles respectively.

4. The combination, in a universal joint, of a ball member in the form of an oblate sphere having its oblate surface recessed and its spherical surface provided with a circumferential groove in one plane coincident with its axis of rotation, a fork member having a concave grooved face, an interposed concavo-convex member constructed with an internal rib fitted to the groove of said ball member and an external rib arranged at right angles to said internal rib and fitted to the groove of said fork member, and an articulated frame in which said ball member and said fork member are mounted to rotate; said ball member and said fork member being carried at the adjoining ends of a pair of spindles, and said frame being constructed with bearings for said spindles respectively, including a ball bearing within the recess of said ball member, substantially as hereinbefore specified.

THEODORE F. TIMBY.

Witnesses:
   Jas. L. Ewin,
   Wm. Ives Lamb.